United States Patent
Boyle

(10) Patent No.: US 7,657,149 B2
(45) Date of Patent: Feb. 2, 2010

(54) METHOD AND APPARATUS FOR STORING A STREAM OF VIDEO DATA ON A STORAGE MEDIUM

(75) Inventor: William B. Boyle, Lake Forest, CA (US)

(73) Assignees: Keen Personal Media, Inc., Lake Forest, CA (US); Keen Personal Technologies, Inc., Lake Forest, CA (US)

( * ) Notice: Subject to any disclaimer, the term of this patent is extended or adjusted under 35 U.S.C. 154(b) by 1560 days.

(21) Appl. No.: 09/747,002

(22) Filed: Dec. 22, 2000

(65) Prior Publication Data

US 2002/0106197 A1    Aug. 8, 2002

(51) Int. Cl.
H04N 9/00        (2006.01)
(52) U.S. Cl. .............................. 386/1; 386/45; 386/109; 386/112; 386/116
(58) Field of Classification Search ................. 386/109, 386/112, 124, 116, 83, 46, 95–96, 125, 126, 386/1, 45; 360/124, 24; 725/39, 50
See application file for complete search history.

(56) References Cited

U.S. PATENT DOCUMENTS

| | | | |
|---|---|---|---|
| 5,784,528 A * | 7/1998 | Yamane et al. | 386/112 |
| 5,897,661 A * | 4/1999 | Baranovsky et al. | 711/170 |
| 6,134,384 A * | 10/2000 | Okamoto et al. | 386/116 |
| 6,549,718 B1 * | 4/2003 | Grooters et al. | 386/83 |
| 6,549,719 B2 * | 4/2003 | Mankovitz | 386/83 |
| 6,611,656 B2 * | 8/2003 | Okada et al. | 386/125 |
| 6,792,000 B1 * | 9/2004 | Morinaga et al. | 370/473 |
| 6,951,031 B2 * | 9/2005 | Hatano | 725/50 |

OTHER PUBLICATIONS

PCT International Search Report dated Apr. 18, 2002; PCT/US01/50432.
Office Action dated Feb. 13, 2008 from European Patent Application No. 01991564.4-1522, filed Dec. 20, 2001, 6 pages.
Office Action datad Feb. 26, 2009 from Canadian Patent Application No. 2,432,170, filed Jun. 19, 2003, 3 pages.

* cited by examiner

Primary Examiner—Jamie J Atala
(74) Attorney, Agent, or Firm—Knobbe, Martens, Olson & Bear, LLP

(57) ABSTRACT

A system for storing video data includes a receiver configured to receive a stream of video data that includes a sequence of original transport packets. Each original transport packet has a first predetermined number of bytes including video data bytes. A first circuit is configured to add a second predetermined number of bytes to each original transport packet to create a modified transport packet having a third predetermined number of bytes. A storage medium is addressable on sector boundaries, wherein each sector has a predetermined number of user data bytes different from the first predetermined number of bytes. The first byte in a modified transport packet aligns with a first user data byte in a sector after a first predetermined number of sectors following a previous alignment.

13 Claims, 5 Drawing Sheets

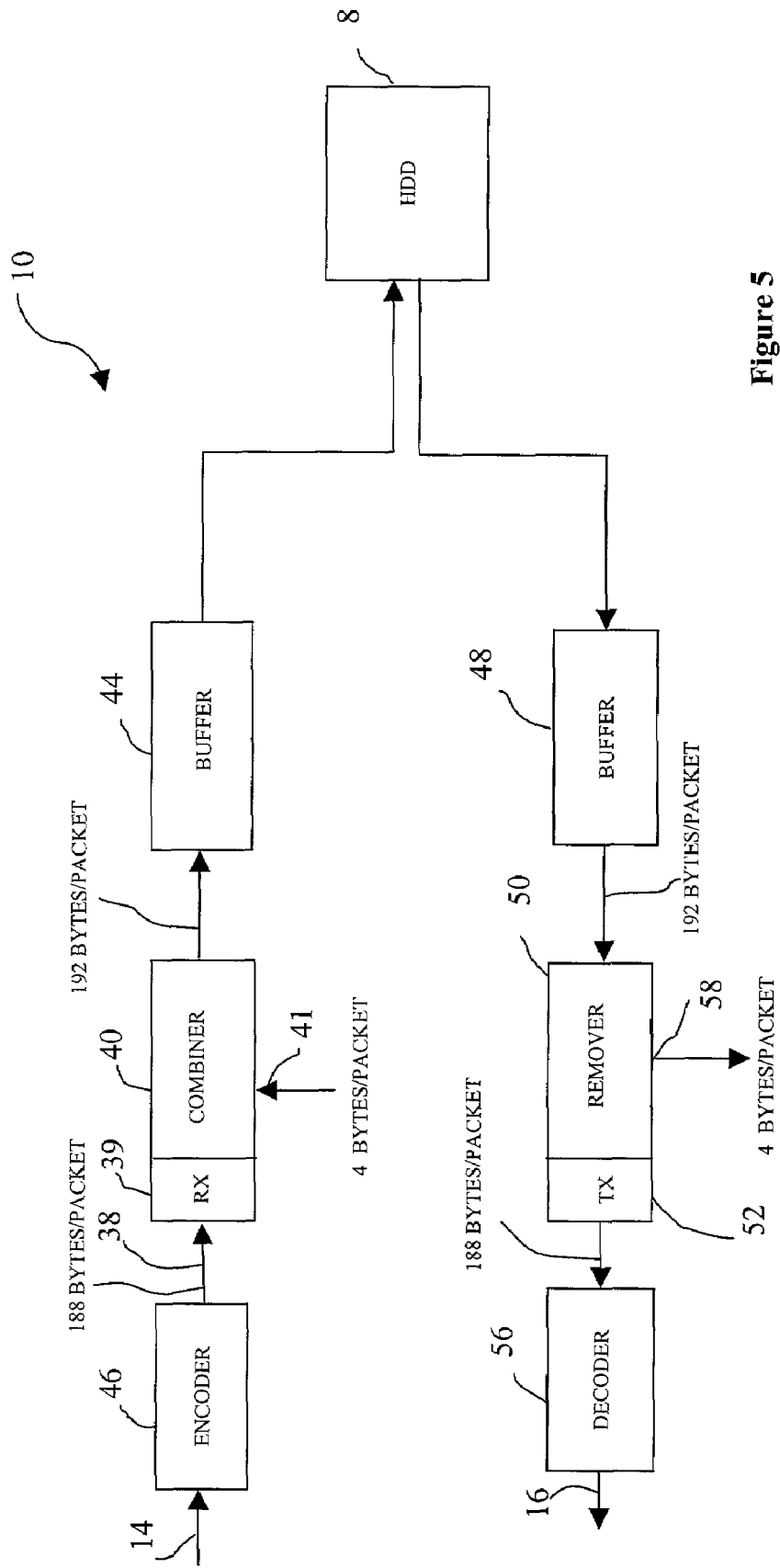

METHOD AND APPARATUS FOR STORING A STREAM OF VIDEO DATA ON A STORAGE MEDIUM

BACKGROUND OF THE INVENTION

1. Field of the Invention

The invention relates to a method and apparatus for storing a stream of video data on a storage medium. More particularly, the invention relates to a method of efficiently accessing video data stored on the storage medium.

2. Description of the Related Art

Video systems transmit, process and store large quantities of video data. To create a video presentation, such as a video movie, a rendering video system displays the video data as a plurality of digital images, also referred to as "frames," thereby simulating movement. In order to achieve a video presentation with an acceptable video quality, or to enable transmission and storage at all, a conventional video system modifies the video data prior to transmission or storage. For instance, the video system compresses and encodes the video data to reduce the bit rate for storage and transmission.

In a conventional video system, a video encoder is used to compress and encode the video data, and a video decoder is used to decompress and to decode the video data. The video encoder outputs a stream of video data that has a reduced bit rate and a reduced redundancy. That is, the technique of video compression removes spatial redundancy within a video frame or temporal redundancy between consecutive video frames. The video encoder and video decoder usually operate in accordance with international standards, e.g., a compression process defined by the Moving Picture Expert Group (MPEG), e.g., MPEG-2, or by the International Telecommunications Union (ITU), e.g., the H.263 standard, that define uniform requirements for video coding and decoding. In addition, manufacturers of video coders and decoders modify or build upon the international standards and implement proprietary techniques for video compression.

The video system may store the compressed stream of video data on a storage medium, for example, a hard disk drive (HDD). The HDD may be included in a digital video recorder (DVR) that is coupled to a monitor or a television set in a viewer's home to record and to display program broadcast signals received via a coaxial cable, a satellite dish or an antenna for terrestrial radio frequency (RF) signals. The HDD may have a storage capacity of, for example, between 10 GB and 30 GB to selectively store, and thus record, up to 80 hours of compressed video and audio data. The recorded video data is then available for later reproduction when the viewer decides to watch the recorded video data.

The HDD includes several platters, wherein each platter records information in concentric circles called tracks. Each track is further broken down into smaller units called sectors, each of which may hold 512 bytes of user data. Each sector, however, actually holds more than 512 bytes of user data. Additional bytes are needed for control structures and other information necessary to manage the HDD, locate data and perform other "support functions". For example, the bytes of a sector's synchronization field assist a drive controller to guide the read process. The sectors store the compressed stream of video data that is also broken down into smaller units, which the MPEG-2 standard defines as transport packets. The DVR reads from the HDD in continuous groups of sectors called clusters, wherein the HDD is addressable on sector boundaries.

Despite the existence of the international standards and the availability of sophisticated HDD technology, there is still a need for an improved technique for accessing video data stored on a HDD. In particular, when the DVR accesses the video data to read from the HDD, periods of stream discontinuity may exist during trick play functions such as Fast Forward, Reverse, Rewind and Skip. During these periods, the DVR may lose synchronization.

SUMMARY OF THE INVENTION

The present invention may be regarded as a method of efficiently accessing video data stored on a storage medium. The method receives a stream of video data that includes a sequence of original transport packets. Each original transport packet has a first predetermined number of bytes that include video data bytes. The method adds a second predetermined number of bytes to the first predetermined number of bytes to create a modified transport packet having a third predetermined number of bytes. The method stores each modified transport packet on a storage medium that is addressable on sector boundaries. Each sector has a predetermined number of user data bytes different from the first predetermined number of bytes.

The first byte in a modified transport packet aligns with a first user data byte in a sector after a first predetermined number of sectors following a previous alignment. The first byte in an original transport packet aligns with a first user data byte in a sector after a second predetermined number of sectors following a previous alignment. In accordance with the present invention, the first predetermined number of sectors is less than the second predetermined number of sectors.

For example, the second predetermined number of sectors is 47, so that the first bytes align periodically every 47 sectors, and the first predetermined number of sectors is three, so that the first bytes align periodically every three sectors.

The present invention may also be regarded as a system for storing video data. The system includes a receiver configured to receive a stream of video data that includes a sequence of original transport packets. Each original transport packet has a first predetermined number of bytes including video data bytes. A first circuit is configured to add a second predetermined number of bytes to each original transport packet to create a modified transport packet having a third predetermined number of bytes. A storage medium is configured to receive and store each modified transport packet. The storage medium is addressable on sector boundaries, wherein each sector has a predetermined number of user data bytes different from the first predetermined number of bytes. The first byte in a modified transport packet aligns with a first user data byte in a sector after a first predetermined number of sectors following a previous alignment. The first byte in an original transport packet aligns with a first user data byte in a sector after a second predetermined number of sectors following a previous alignment. In accordance with the present invention, the first predetermined number of sectors is less than the second predetermined number of sectors.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

FIG. 5 schematically illustrates an exemplary embodiment of a control circuit coupled to the storage medium, wherein the control circuit modifies the stream of video data in accordance with the present invention.

DETAILED DESCRIPTION OF PREFERRED EMBODIMENT

Figure 1:
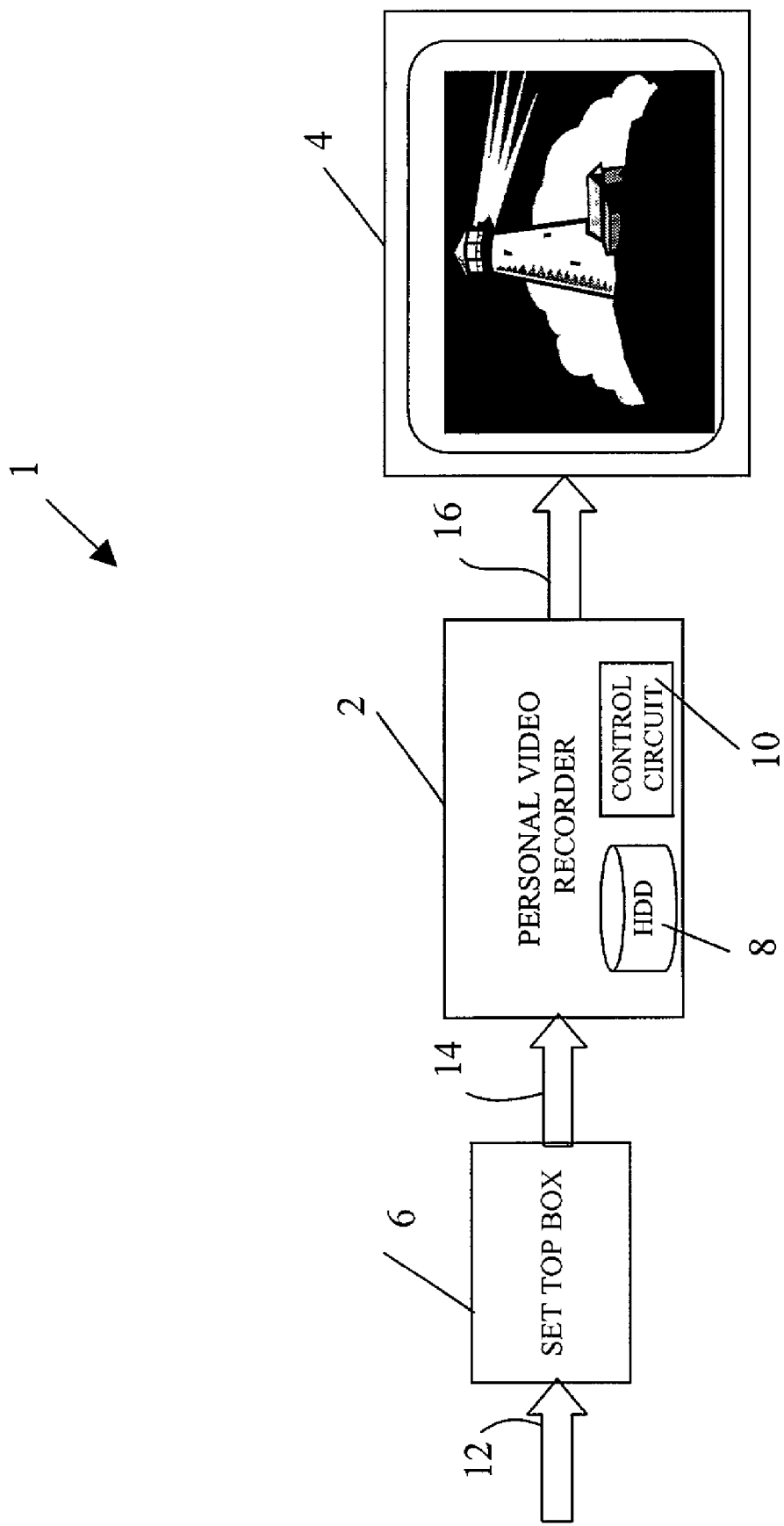
FIG. 1 shows a system for storing and displaying video data in accordance with an embodiment of the present invention that includes a personal video recorder connected to a display for displaying the stream of the data, wherein the personal video recorder includes a storage medium and a control circuit that controls access to the storage medium.

FIG. 1 shows an embodiment of a system 1 for storing and displaying video data in accordance with an embodiment of the present invention, which is configured to operate in accordance with the method of the present invention. The system 1 includes a digital personal video recorder 2, a display 4 and a set top box 6. The personal video recorder 2 is connected to the set top box 6 through a data line 14 and is connected to the display 4 through a data line 16. The personal video recorder 2 includes a storage medium 8 and a control circuit 10 that controls storing of a stream of video data on the storage medium and retrieval of the stored video data from the storage medium 8. The stream of video data is a stream of compressed digital signal received from the set top box 6 or generated within the personal video recorder 2. Further details of the system 1 are described below.

Figure 2:
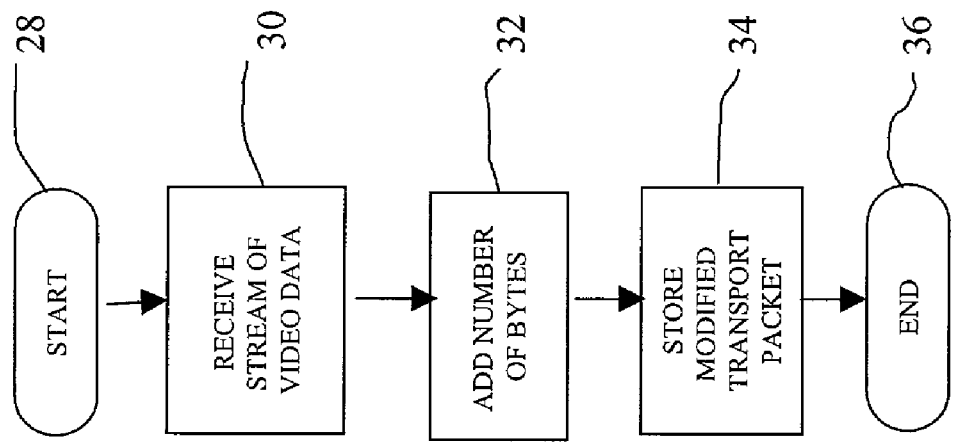
FIG. 2 is a flowchart in accordance with an embodiment of the present invention that modifies the stream of video data by adding a predetermined number of bytes to every transport packet within the stream of video data.

FIG. 2 is a flowchart of a procedure illustrating the method in accordance with the present invention that efficiently accesses the video data stored on the storage medium 8. In a step 28, e.g., when the viewer activates the system 1 and turns the personal video recorder 2 on, the procedure initializes the system 1. The initialization procedure includes determining whether the personal video recorder 2 is operating and is properly connected to record the stream of video data, and also includes determining how much storage capacity is available on the personal video recorder 2.

In a step 30, the procedure receives the stream of video data that includes a sequence of original transport packets. Each original transport packet has a first predetermined number of bytes including video data bytes. In one embodiment, the first predetermined number of bytes is 188.

In a step 32, the procedure adds a second predetermined number of bytes to the first predetermined number bytes to create a modified transport packet. The modified transport packet has a third predetermined number of bytes. In one embodiment, the second predetermined number of bytes is four so that the third predetermined number of bytes is 192.

In a step 34, the procedure stores each modified transport packet on the storage medium 8 that is addressable on sector boundaries. Each sector has a predetermined number of user data bytes different from the first predetermined number of bytes. In one embodiment, the predetermined number of user data bytes is 512.

The first byte in a modified transport packet aligns with a first user data byte in a sector after a first predetermined number of sectors following a previous alignment. The first byte in an original transport packet aligns with a first user data byte in a sector after a second predetermined number of sectors following a previous alignment. In accordance with the present invention, the first predetermined number of sectors is less than the second predetermined number of sectors. For example, the second predetermined number of sectors is 47, so that the first bytes align periodically every 47 sectors in the stream of original transport packets, and the first predetermined number of sectors is three, so that the first bytes align periodically every three sectors in the stream of modified transport packets.

The first byte of a modified transport packet therefore aligns more often with the first byte of a sector so that the system 1 can more efficiently access the video data stored on the storage medium 8. This enables in particular trick play functions of the system 1, e.g., Fast Forward, Reverse, Rewind, Skip and the like, to operate without loss of synchronization. When the system 1 uses, for example, a cluster size of three sectors, a start of a cluster is guaranteed to have the first byte of the modified transport packet align with the first byte of the sector.

Figure 3A:
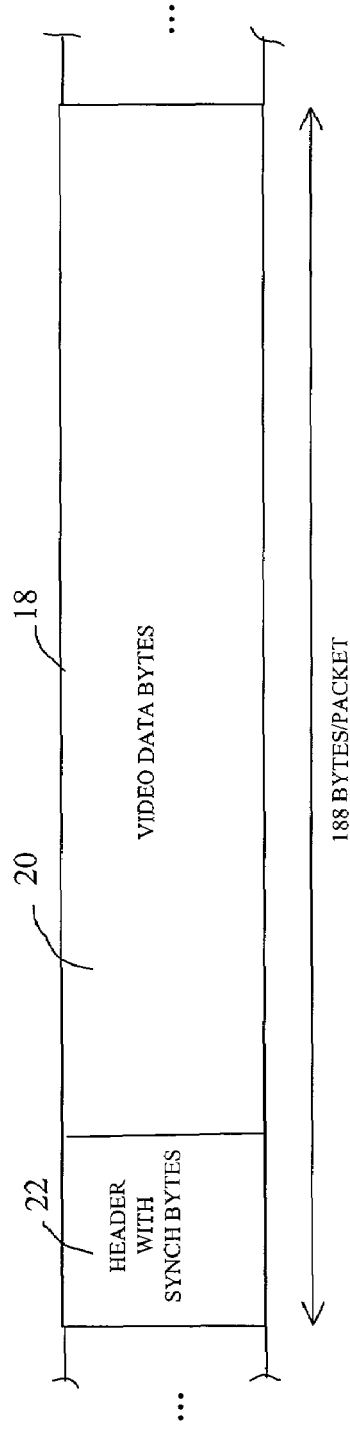
FIG. 3A illustrates an original transport packet that includes 188 bytes, including bytes for a header and video data bytes.

Figure 3A illustrates an original transport packet 18 that is part of the stream of video data. Although FIG. 3A shows only one original transport packet 18 it is contemplated that the stream of video data includes a plurality of the original transport packets 18. The stream of video data corresponds to an analog video signal broadcast by a broadcast head end. An encoder, either within the set top box 6 or within the personal video recorder 2, receives the video signal and compresses the video signal in accordance with known encoding and compression techniques, for example, in accordance to the MPEG-2 standard. The encoder outputs the stream of video data that includes the sequence of original transport packets 18. Each original transport packet 18 includes bytes for a header 22 that includes synchronization bytes and video data bytes 20. For example, the video data bytes 20 in the original transport packet 18 represent a portion of a broadcast program or video movie. In one embodiment, the transport packet 18 includes 188 bytes as defined by the MPEG-2 standard.

Figure 3B:
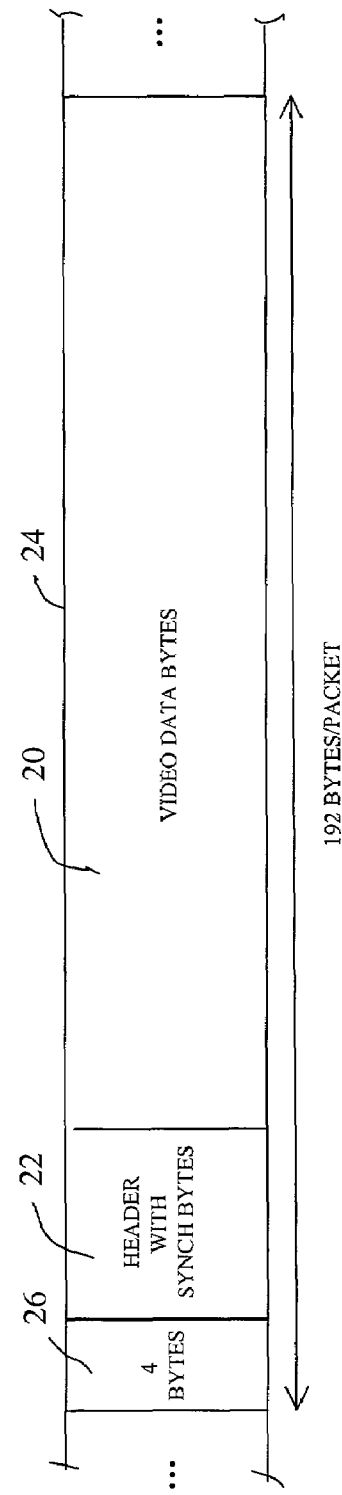
FIG. 3B illustrates a modified transport packet that includes 192 bytes, wherein the 192 bytes of each modified transport packet include the video data bytes, the bytes for the header and a predetermined number of additional bytes in accordance with the present invention.

FIG. 3B illustrates an embodiment of a modified transport packet 24. The modified transport packet 24 also includes the header 22 and the video data bytes 20. In accordance with the present invention, the modified transport packet 24 further includes a predetermined number of additional bytes 26. In one embodiment, the predetermined number of bytes is four so that the modified transport packet 24 includes 192 bytes.

Figure 4:
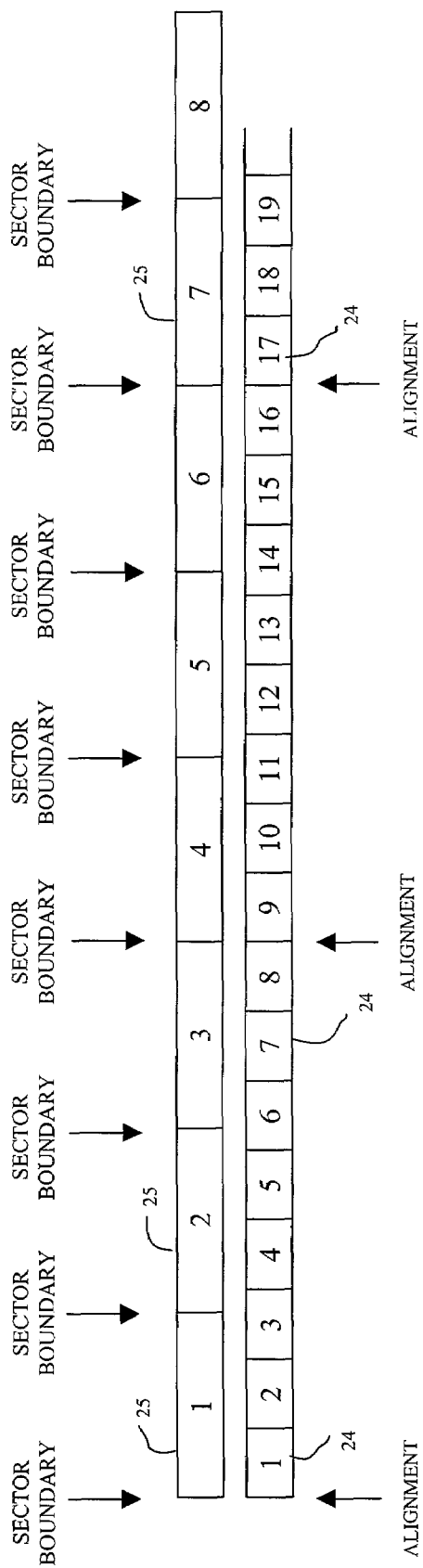
FIG. 4 schematically illustrates a sequence of sectors and a sequence of modified transport packets, wherein a boundary of a modified transport packet aligns with a boundary of user data bytes of a sector periodically every three sectors.

FIG. 4 schematically illustrates a sequence of sectors 25 and a sequence of modified transport packets 24 to illustrate one embodiment of the method in accordance of the present invention. For illustrative purposes, FIG. 4 shows eight sectors 25 and 19 modified transport packets 24 as blocks without showing the internal byte structures of the sectors 25 and the modified transport packets 24. In one embodiment, a sector 25 includes 512 user data bytes. Note that each sector 25 includes additional bytes that are not shown because the present invention is directed only to the efficient use of the user data bytes in the sectors. A boundary of the first modified transport packet 24 aligns with a boundary of the user data bytes of the first sector 25, a boundary of the eighth modified transport packet 24 aligns with a boundary of the user data bytes of the fourth sector 25, and a boundary of the $17^{th}$ modified transport packet 24 aligns with a boundary of the user data bytes of the seventh sector 25. That is, the first byte in a modified transport packet 24 aligns with a first user data byte in the sector 25 after a predetermined number (e.g., 3) of sectors 25 following a previous alignment. A cluster of three sectors 25, thus, includes eight modified transport packets 24.

In accordance with the present invention, this alignment occurs more often than in a prior art system that stores the original transport packets 18. That is, in a prior art system, the alignment of the first bytes occurs after a predetermined number (e.g., 47) of sectors 25. A cluster of 47 sectors 25, tints, includes 128 original transport packets 18. The more frequent alignment and the smaller cluster size in accordance with the present invention provides for more efficient access to the stored video data because the synchronization performance is improved and repeated re-locking of a decoder (e.g., a MPBG-2 decoder) is avoided. The system 1 in accordance with the present invention can access data that is of interest sooner than in a prior art system, namely after 3 sectors instead of 47 sectors.

FIG. 5 schematically illustrates an exemplary embodiment of a control circuit 10 coupled to the storage medium 8, to an encoder 46 and to a decoder 56. In one embodiment, these components are located within the personal video recorder 2. The encoder 46 receives a video signal from the set top box 6 and generates a compressed video signal, which is the stream of video data that includes the original transport packets 18. The encoder 46 outputs the stream of video data to an input 38 of the control circuit 10. The control circuit 10 processes the stream of video data prior to storing the video data on the storage medium 8 and after retrieval of the video data from the storage medium 8. The decoder 56 is coupled to an output of the control circuit 10 and decodes the stream of video data so that it can be displayed on the display 4.

In a branch that interconnects the encoder 46 and the storage medium 8, the control circuit 10 includes a combiner 40, which includes a receiver 39, and a buffer 44. In a branch that connects the storage medium 8 and the decoder 56, the control circuit 10 includes a buffer 48 and a remover 50 that includes a transmitter 52. Although FIG. 5 shows the elements of the control circuit 10 as individual and separate elements, it is contemplated that at least some of these elements may be combined in an application-specific integrated circuit (ASIC). For example, the buffers 44, 48 may be implemented in a single random access memory (RAM), wherein the buffers 44, 48 occupy different portions of the RAM.

The combiner 40 may be a multiplexer that inserts the four bytes in front of the header 22 as shown in FIG. 3B. In an alternative embodiment, the combiner 40 may insert the four bytes behind the header 22. The combiner 40 may receive a clock signal from the receiver 39 indicating a start of an original transport packet 18. The combiner 40 forwards each modified transport packet having 192 bytes to the buffer 44.

The remover 50 may be a demultiplexer that removes the four bytes from the modified transport packet 24 after it is read from the storage medium 8. The remover 50 may also receive a clock signal indicating a start of a modified transport packet 24. The transmitter 52 forwards each transport packet having 188 bytes to the decoder 56.

The set top box 6 shown in FIG. 1 is configured to receive broadcast video signals from a broadcast head end via a cable 12. The broadcast video signals include a multitude of channels with a multitude of programs having audio and video data. The broadcast head end may further enable the viewer to subscribe to and receive subscription services and conditional access broadcast services, such as video-on-demand or pay-per-view services. The format of the broadcast video signals may be in accordance with known video and television formats, such as NTSC, PAL, S-Video or the like.

The set top box 6 and the digital video recorder 2 may be combined into a single apparatus. The apparatus then combines the functionalities of the set top box 6 and the digital video recorder 2 that is coupled to the head end to receive the program broadcast signals.

What is claimed is:

1. A method of storing a video data stream on a hard disk drive (HDD) for efficient non-sequential access to the stored stream of video data, the HDD having a plurality of sectors, each sector having a first integer of user data bytes, the HDD addressable on sector boundaries for non-sequential access, the video data stream including a sequence of original transport packets, each original transport packet having a second integer of bytes, the second integer of bytes different from the first integer of user data bytes, wherein a third integer of original transport packets are storable in a fourth integer of sectors, the fourth integer being a minimum number of sectors with the same number of user data bytes as the number of bytes in the third integer of original transport packets, the method comprising:
   receiving the sequence of original transport packets;
   adding a fifth integer of bytes to each original transport packet to create a sequence of modified transport packets, each modified transport packet having a sixth integer of bytes; and
   storing the sequence of modified transport packets on the HDD, wherein a seventh integer of modified transport packets are stored in an eighth integer of sectors, the eighth integer being a minimum number of sectors with the same number of user data bytes as the number of bytes in the seventh integer of modified transport packets, the eighth integer of sectors smaller than the fourth integer of sectors.

2. The method of claim 1, wherein the second integer of bytes is 188.

3. The method of claim 2, wherein the fifth integer of bytes is four so that the sixth integer of bytes is 192.

4. The method of claim 1, wherein the second integer of bytes is 188 and wherein the fifth integer of bytes is four so that each modified transport packet has a length of 192 bytes.

5. The method of claim 4, wherein the first integer of user data bytes is 512, and wherein the eighth integer of sectors is three.

6. The method of claim 1, wherein the first integer of user data bytes is 512.

7. The method of claim 1, wherein each original transport packet includes synchronization bytes located at a beginning of each original transport packet, and wherein the fifth integer of bytes is added in front of the synchronization bytes.

8. The method of claim 1, wherein each original transport packet includes synchronization bytes located at a beginning of each original transport packet, and wherein the fifth integer of bytes is inserted behind the synchronization bytes.

9. The method of claim 1, further comprising passing each modified transport packet through a first buffer prior to storing on the HDD.

10. A system for storing video data for efficient non-sequential access to the stored video data, the system comprising:
   a receiver configured to receive a stream of video data that includes a sequence of original transport packets, wherein each original transport packet has a first predetermined number of bytes;
   a first circuit configured to add a second predetermined number of bytes to each original transport packet to create a modified transport packet having a third predetermined number of bytes; and a hard disk drive (HDD) configured to receive and store each modified transport packet, wherein the HDD is addressable on sector boundaries, each sector having a predetermined number of user data bytes different from the first predetermined number of bytes, wherein:

the first byte in an original transport packet aligns with a first user data byte in a sector after a first predetermined number of sectors following a previous alignment; and the, first byte in a modified transport packet aligns with a first user data byte in a sector after a second predetermined number of sectors following a previous alignment, wherein the second predetermined number of sectors is less than the first predetermined number of sectors.

11. The system of claim 10, further comprising a second circuit configured to remove the second predetermined number of bytes from each modified transport packet retrieved from the HDD.

12. The system of claim 10, wherein the first predetermined number of bytes is 188 and wherein the second predetermined number of bytes is four so that the third number of bytes is 192 bytes.

13. The system of claim 12, wherein the predetermined number of user data bytes is 512, and wherein die second predetermined number of sectors is three.

* * * * *